April 8, 1924.
T. R. BEGGS
PRESSURE REDUCING VALVE
Filed July 2, 1919
1,489,811
2 Sheets-Sheet 1
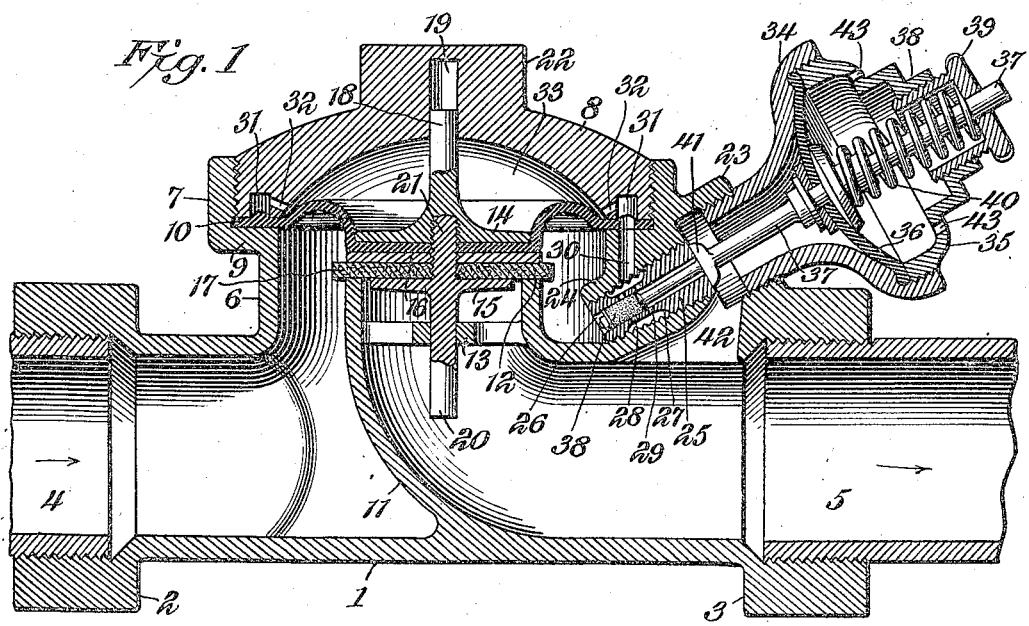
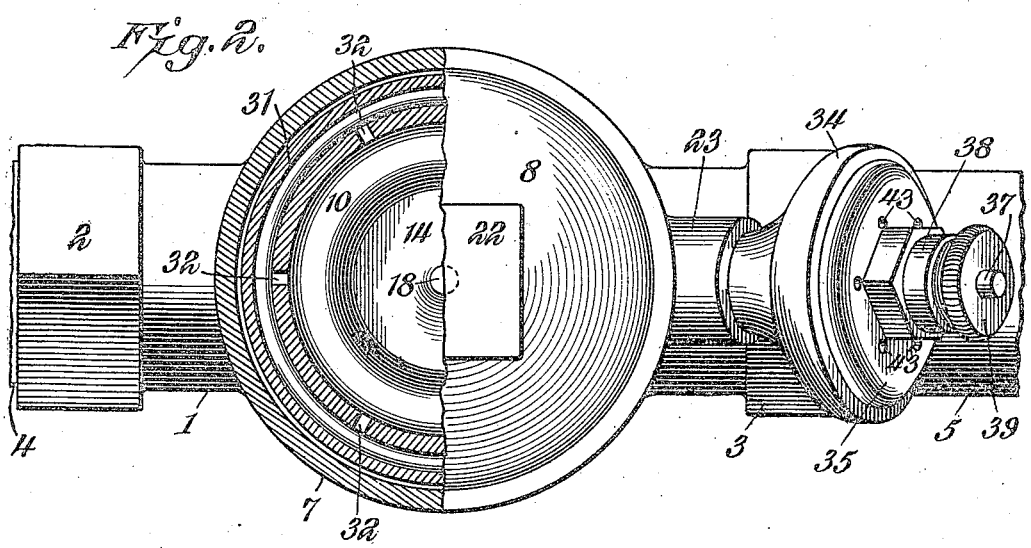
WITNESSES
Howard D. Orr.
F. T. Chapman.
Thomas R. Beggs, INVENTOR,
BY
ATTORNEY April 8, 1924.  
T. R. BEGGS  
1,489,811  
PRESSURE REDUCING VALVE  
Filed July 2, 1919    2 Sheets-Sheet 2
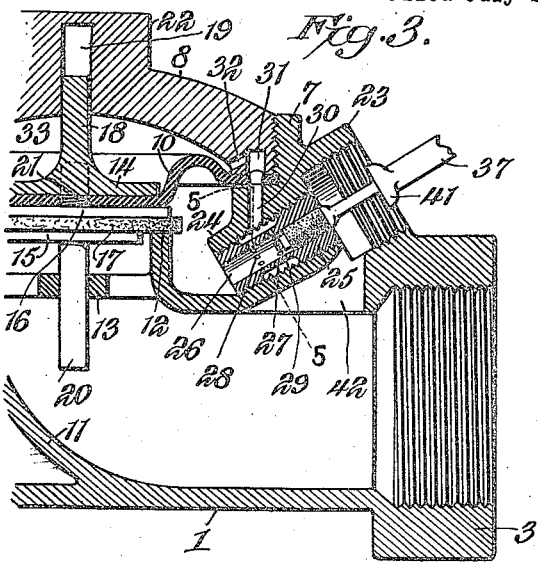
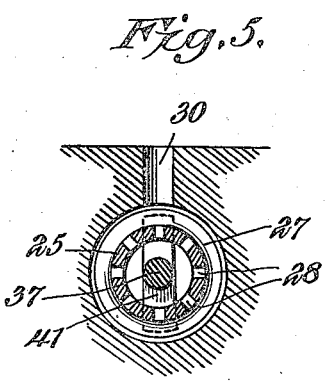
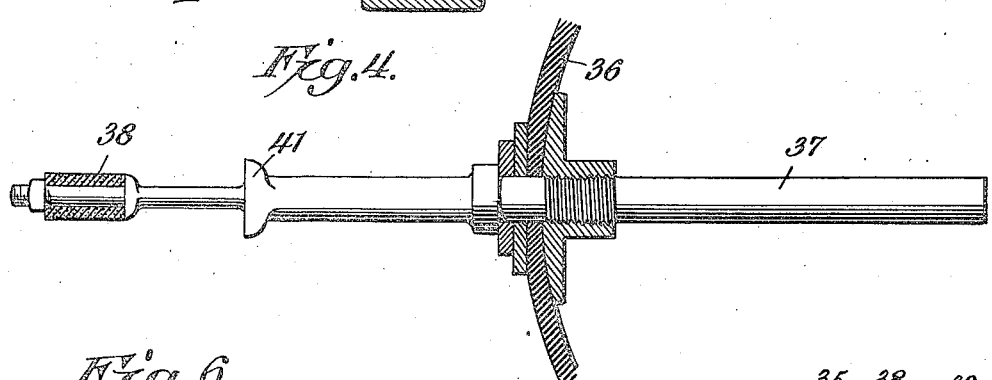
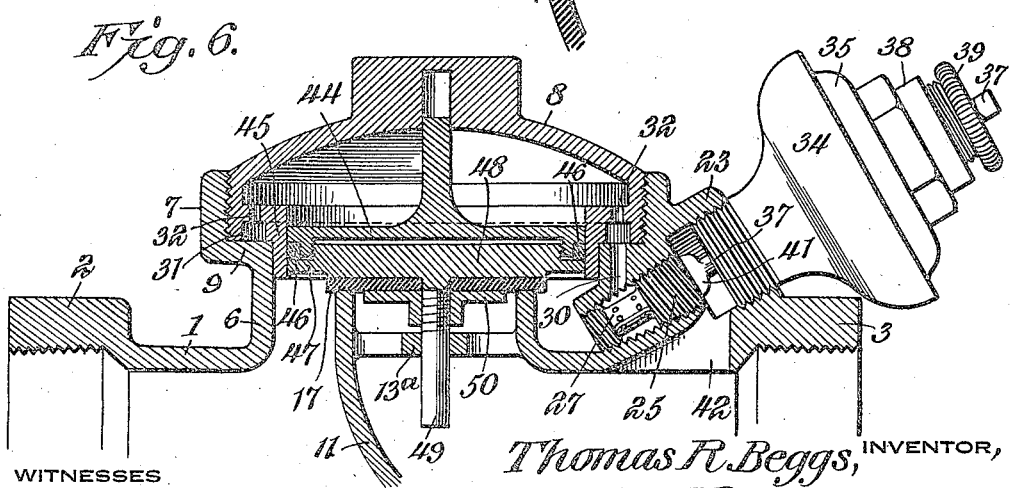
Thomas R. Beggs, INVENTOR, Patented Apr. 8, 1924.

1,489,811

UNITED STATES PATENT OFFICE.

THOMAS ROBERT BEGGS, OF NEW YORK, N. Y., ASSIGNOR, BY MESNE ASSIGNMENTS, OF ONE-HALF TO BERNARD J. SMITH, OF HARTFORD, CONNECTICUT.

PRESSURE-REDUCING VALVE.

Application filed July 2, 1919. Serial No. 308,313.

*To all whom it may concern:*

Be it known that I, THOMAS R. BEGGS, a citizen of the United States, residing at New York, in the county of New York and State of New York, have invented a new and useful Pressure-Reducing Valve, of which the following is a specification.

This invention has reference to pressure reducing valves, and its object is to provide a particularly efficient structure of small size for effecting the reduction of pressure and to replace with even greater efficiency the large reducing valve structures customarily used.

In accordance with the invention, there is provided a valve structure having a body portion with an intermediately located seat dividing the high and low pressure sides of the structure and with a dome or cap covering the seat and forming a holding means for a movable member in the form of a diaphragm or piston constituting a carrying device for a movable valve adapted to the valve seat. The movable valve member is responsive to variations in pressure and is of the differential type controlled by a pressure responsive device subject to variations in the low pressure side of the reducing valve. Provision is also made for adjusting the response of the reducing valve to predetermined limits.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a longitudinal section through the valve structure, with some portions in elevation.

Figure 2 is a plan view of the structure shown in Figure 1, with some portions in cross section.

Figure 3 is a fragmentary section similar to the showing of Figure 1 but illustrating another position of certain parts.

Figure 4 is a detail section of the low pressure controlling member.

Figure 5 is a section on the line 5—5 of Figure 3.

Figure 6 is a view similar to Figure 1 but showing a modification of certain parts of the structure.

Referring to the drawings, there is shown a valve casing 1 with terminal bells 2, 3, at opposite ends, to receive pipes 4, 5, the pipe 4 being assumed to come from a source of water under pressure and the pipe 5 to lead a point of disposition of the water. For instance, the pipe 4 may be connected to city mains and the pipe 5 may be connected to the distributing system of a building where water is drawn from spigots or other outlets at different times and to different extents so that the water pressure in the pipe 5 may fluctuate to considerable extents while the water pressure in the pipe 4 remains quite constant. Moreover, the water pressure in the pipe 4 may be assumed to be quite high and much higher than the water pressure desirable in the pipe 5.

Projecting from one side of the casing 1, usually though not necessarily the upper side, is a neck 6 formed at the outer end with a screw socket 7 into which there is fitted a cap or dome 8. Between the neck 6 and the socket 7 is an outwardly expanded ledge 9 against which the cap 8 is arranged to force a diaphragm 10, which may be in the form of a rubber or leather diaphragm such as is employed in diaphragm valves.

Extending into the neck 6 toward the dome 8 and communicating directly with the bell 3 is a pipe extension or elbow 11 terminating at the outer end in a valve seat 12 and also having a guiding spider 13 therein. The mid portion of the diaphragm 10 is clamped between two plates 14 and 15 respectively, with a washer 16 and a valve leather 17, or other suitable structure, interposed. The plate 14 is provided with a central stem 18 movable along a socket 19 formed in the crown of the dome 8. The plate 15 is provided on one side with a stem 20 located diametrically opposite the stem 18 and movable through the guiding spider 13. On the opposite side of the plate 15 from the stem 20 is another stem 21 threaded to enter a suitably threaded socket in the plate 14 so that the two stems may be screwed tightly together, holding the valve leather or packing 17 and washer 16 against the diaphragm 10 and plate 14. This structure permits a guided play of the diaphragm 10 toward and from the valve seat with the valve leather or packing 17 movable into and out of contact with the valve seat and thereby closing or opening communication between the pipes 4 and 5 in accordance with the position of the valve member 17. The cap or dome 8 is formed with a square or otherwise suitably shaped boss 22 for the application of a suitable tool.

Projecting from one side of the neck 6 on the side thereof toward the socket 3 is an interiorly threaded nipple 23 and between the nipple 23 and the interior of the neck 6 there is provided an interiorly threaded continuation 24 of the bore of the nipple 23 but preferably of smaller diameter, the bore continuation 24 opening into the high pressure side of the neck 6. Screwed into or otherwise fast in the bore continuation 24 is a taper tube 25 having a straight through bore 26 and the exterior of the tube 25 is provided with a circumferential groove 27 of suitable length communicating with the bore 26 by way of sets of perforations 28, 29, the groove 27 being long enough to include both sets of perforations. Leading from the bore continuation at the groove 27 is a passage 30 opening through the ledge 9 on the side thereof toward the nipple 23, it being understood that there may be either one or more passages 30.

The dome or cap 8 is formed on its face toward the ledge 9 with a circumferential groove 31 opening through numerous ports 32 into the chamber within the dome 8 on the corresponding side of the diaphragm 10 so that the chamber within the dome, and designated by the numeral 33, is in communication with the high pressure side of the valve structure through widely distributed points.

Screwed into the nipple 23 is the small end of an expanded cup-like member 34 formed at the large end to receive a threaded cap 35, whereby to clamp a flexible diaphragm 36 in the wide end of the cup 34. Extending through and carried by the diaphragm 36 is a stem 37 prolonged to enter the bore 26 within which latter the stem 37 carries a piston or plunger 38. This plunger is large enough to snugly fit the bore 26 and is long enough and has an extent of travel to close both series of perforations 28 and 29 at one time or to open either of them. In one instance, when one series only is closed, the high pressure side of the valve structure is put into communication with the chamber 33 through the passage 30 and when the other series of perforations is opened the chamber 33 is cut-off entirely from the high pressure side and may exhaust through the perforations 29 by way of the bore 26 into the low pressure side of the reducing valve structure. When both perforations or ports 28 and 29 are closed the valve is locked.

The cap or cover 35 is provided with an axially extended neck 38 into which is screwed a cap nut 39 traversed by a portion of the stem 37 projecting beyond the outer face of the diaphragm 36. Between the cap nut 39 and the diaphragm 36 the stem 37 is surrounded by a spring 40 tending to force the diaphragm 36 and stem 37 carried thereby toward the interior of the valve structure so that ordinarily when there is no pressure within the valve structure the piston 38 is forced inwardly to an extent to uncover the ports 29 and close the ports 28. In order to limit the movement of the stem 37, under the action of the spring 40, the stem carries a stop 41 bridging the bore 26 so as to engage the cylinder 25, but this bridge piece is too narrow to close the bore and consequently there is always communication between the bore 26 and the low pressure side of the structure through the passage-way 42 leading from the interior of the nipple 23 to the low pressure side of the casing 1. Perforations 43 in the cap or cover 35 avoid the establishment of any back pressure within the cap or cover.

The cap nut 39 provides a convenient means whereby the tension of the spring 40 may be established or changed, thereby determining the pressure at which the plunger 38 will yield to permit the admission of high pressure water to the chamber 33 and the closure of the main inlet valve 17.

When there is no pressure at all in the device the spring 40, by its normal tendency to expand, forces the piston or packing 38 to a position closing the ports 28, while the other ports 29 are open to the low pressure side of the device. When the water is turned on, on the high pressure side, the main valve or valve member 17 is opened by the yielding of the diaphragm 10 under the superior pressure directed against the high pressure side of the diaphragm, whereupon, water at high pressure flows into the pipe line 5. At the same time water under the distributing line pressure, which at the time is the main line pressure, reaches the diaphragm 36, and also through the passage 42, bore 26, ports 29, passage 30, and passage 31, with its ports 32, reaches the chamber 33, establishing pressure on the side of the diaphragm 10 remote from the valve seat 12. The pressure in the chamber 33 has a larger area of the diaphragm 10 to operate upon than on the high pressure side, and becomes for the time being the high pressure side of the valve whereupon, the diaphragm valve is closed when the difference in pressure is sufficient. At the same time the increasing pressure on the diaphragm 36 causes a movement of the piston or plunger 38 to close both series of ports 28 and 29 and ultimately to close the ports 29 and open the ports 28, whereupon full service pressure passes to the chamber 33 through the passage 30 and the diaphragm valve is held firmly closed.

As water is used from the pipe 5 the pressure lowers and finally the spring 40 is enabled to overcome the water pressure on the low pressure side to an extent to move the stem 37 so as to close the ports 28 and open the ports 29, thus releasing the pressure in the chamber 33. Now when the pressure in the chamber 33 is overbalanced, the high or service pressure is sufficient to again open the diaphragm valve 17 and admit water to the low pressure side causing a rise of pressure therein overcoming the spring 40 until equilibrium is established. So long as no water is used on the low pressure side the diaphragm valve remains closed but as soon as pressure is reduced on the low pressure side by the use of water, the holding water in the chamber 33 is allowed to escape through groove 31, ports 32, and passage 30 and the high pressure water causes the opening of the main valve and the flow of more water into the low pressure side.

These movements are always small and gentle and the fluctuations are but slight but some fluctuation is needed to cause the operation of the reducing valve. The whole structure is susceptible of embodiment in very small size as compared with reducing valves as heretofore made when constructed for the same capacity.

Instead of employing a diaphragm, like the diaphragm 10, such diaphragm may be replaced by a plunger 44, shown in Figure 6, working in a barrel 45 forming part of the dome 8. The plunger is provided with packing 46 held to it by a flange 47 on a peripheral portion of a plate 48 corresponding to the plate 14 in the structure of Figure 1. In order to confine the packing 46 the plates 44 and 48 are screwed together. The plate 48 is provided with a stem 49 extending through a guiding spider 13ª and the stem 49 is threaded to receive a clamping plate 50 for holding the valve leather 17. It will be understood, of course, that a similar arrangement may be provided to replace the diaphragm 36.

While the diaphragms 10 and 36 are customarily so called, the plunger 44, in the showing of Figure 6, performs the functions of the diaphragm and the operation of the reducing valve as a whole is the same in Figure 6 as in Figure 1. Since the plunger 44 separates the high pressure side of the reducing valve from the chamber 33 and the latter communicates only by small passageways with the low pressure side of the valve structure, the plunger 44 will be considered as included in the scope of the term diaphragm when applied to the structures of either Figures 1 or 6. The same interpretation is to be had with respect to the diaphragm 36 or another arrangement of like nature when replacing it.

What is claimed is:—

1. A pressure reducing valve, comprising a casing provided with an inlet and an outlet and an intermediate seat dividing the casing into high and low pressure sides, a differential valve responsive to fluid pressure and adapted to said seat and providing an intermediate chamber above said valve, said chamber having a passage communicating therewith, another pressure responsive valve having communication with both the high and low pressure sides of the first-mentioned valve and provided with two sets of ports, either of which may be put into communication with said passage, said valve having means adapted to close both sets of ports at one time or to open either set and place the same in communication with either the high or low pressure sides through the second-mentioned valve, said ports being adapted to communicate with said passage to either feed or bleed said chamber through the same passage.

2. A pressure reducing valve, comprising a casing with inlet and outlet ends and an intermediately located seat dividing the high and low pressure sides of the structure, a differential valve located between the inlet and outlet ends and responsive to fluid pressure, said valve being adapted to said seat and the space in the casing above said valve forming a chamber, another pressure responsive valve at one side of the differential valve, the second-mentioned pressure responsive valve being provided with two sets of ports, both of which communicate with said chamber, one set leading through the second-mentioned pressure responsive valve to the low pressure side, and the other set communicating with the high pressure side of the valve structure, means actuated by the second-mentioned pressure responsive valve to close one set of the ports and open the other, or close both sets at one time, and adjustable means for interposing predetermined forces to the movement of the second-mentioned pressure responsive valve.

3. A pressure reducing valve comprising a casing with inlet and outlet ends, and an intermediately located seat dividing the high and low pressure sides of the structure, a differential valve located between the inlet and outlet ends and responsive to fluid pressure, said valve being adapted to said seat, the space in the casing above said valve forming a low pressure chamber, another pressure responsive valve in the valve casing at one side of the differential valve, said pressure responsive valve provided with two spaced sets of ports, both of which communicate with the chamber at the low pressure side of the differential valve, one set leading through the pressure responsive valve to the outlet, and the other set communicating with the high pressure side of the differential valve, and means actuated by the pressure responsive valve to close one set of the ports and open the other or close both sets at one time.

4. A pressure reducing valve structure provided with a pressure responsive valve member between the high and low pressure sides of the valve structure, said valve structure having a chamber separated from the high and low pressure sides and into which the movable member of the valve may pass, said chamber having passages with ducts leading thereto, and means for controlling the ducts comprising a reciprocable plunger passing the ducts, a stem carrying the plunger, a means yieldable to fluid pressure and controlling the stem, and adjustable elastic means for establishing resistance to the movement of the yieldable means under the fluid pressure exerted thereon.

5. A pressure reducing valve structure comprising a casing with inlet and outlet ends, an intermediate valve seat, dividing the high and low pressure sides of the structure, a neck enclosing the valve seat, a cover or dome for the neck, and a nipple extending from one side of the neck, a valve member for the valve seat defining a chamber above said valve member and adapted to engage and move from the valve seat, ducts between the chamber and the high and low pressure sides of the casing, a plunger movable to open and close the ducts, a stem carrying the plunger, a cup into which the stem extends, a pressure responsive member in the cup connected to the stem, and an adjustable spring in the cup for determining the fluid pressure under which the stem may be moved in opposition to the spring.

6. A pressure reducing valve comprising a casing with inlet and outlet ends, and an intermediately located seat dividing the high and low pressure sides of the valve structure, a differential valve located between the inlet and outlet ends and responsive to fluid pressure, said valve being adapted to said seat, said casing being provided with a cap spaced from said valve and forming an intermediate chamber, said cap being provided with a circumferential groove opening through a series of ports into said chamber, a passage communicating with said groove, another pressure responsive valve at one side of and below the differential valve, and a double set of ports controlled by said pressure responsive valve, said ports being adapted to communicate with said chamber through said passage.

7. A pressure reducing valve comprising a casing with inlet and outlet ends and an intermediate seat dividing the high and low pressure sides of the structure, a differential valve located between the inlet and outlet ends and responsive to fluid pressure, said valve being adapted to said seat, a cap for said casing spaced above said valve and forming an intermediate chamber, said cap being provided with a circumferential groove having ports leading to said chamber and a passage leading outwardly, another pressure responsive valve located at one side of and below said differential valve, said pressure-responsive valve having a bore open at its inner end and provided at an intermediate point with two sets of ports, and said valve having a plunger to fit said bore and adapted to close both sets of ports at one time, or to open and close either set, said ports being adapted to communicate with said passage to either feed or bleed said chamber, and adjustable means for interposing predetermined forces to the movement of said plunger.

In testimony that I claim the foregoing as my own, I have hereto affixed my signature.

THOMAS ROBERT BEGGS.

Witnesses:
 REBECCA ZUCKERMAN,
 BENJ. ZUCKERMAN, Jr.